Figure 1:
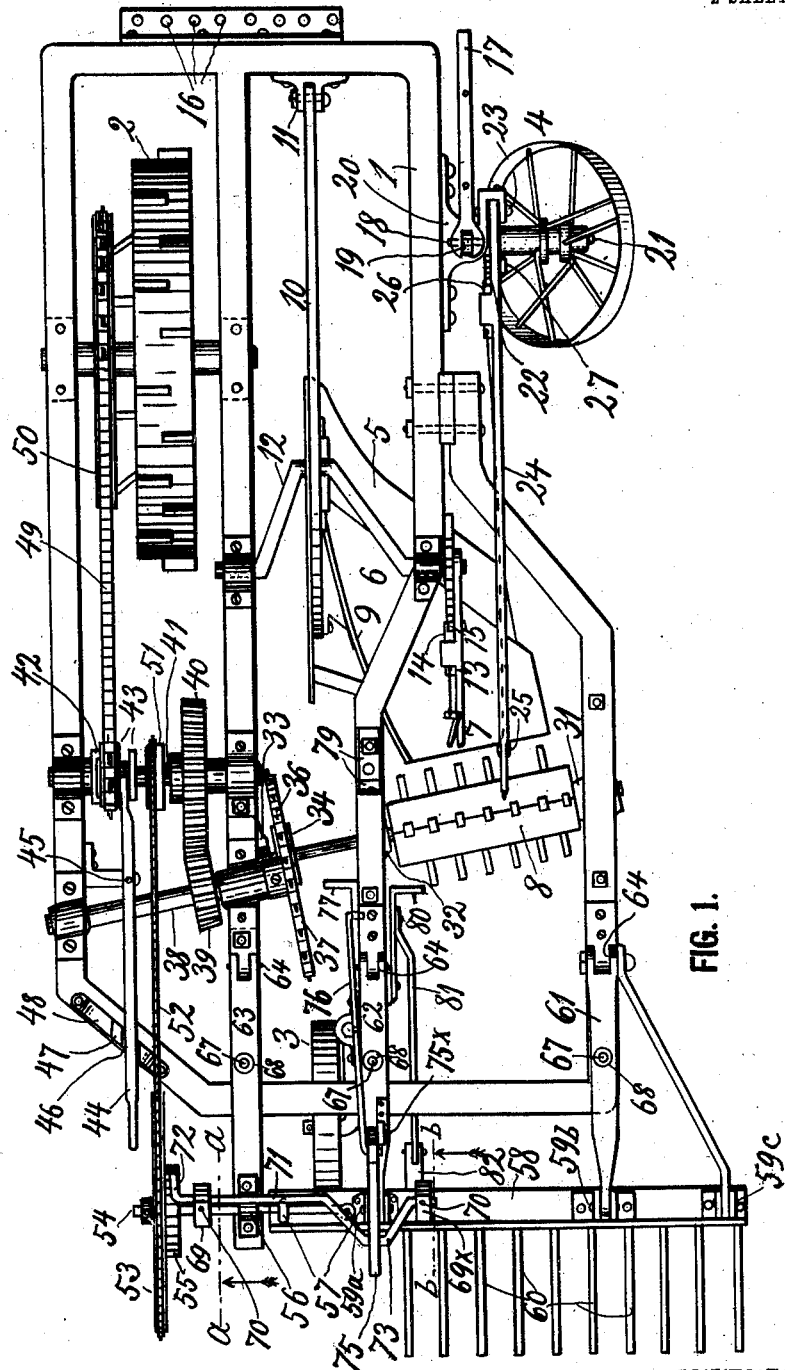

N. W. NELSON & A. J. THORVIG.
QUACK GRASS DESTROYING MACHINE.
APPLICATION FILED MAR. 11, 1910.

983,304.

Patented Feb. 7, 1911.
2 SHEETS—SHEET 1.

WITNESSES:
M. M. Carlsen.
O. C. Carlsen

INVENTORS:
Nels W. Nelson,
Albert J. Thorvig.
BY their ATTORNEY:
A. M. Carlsen.

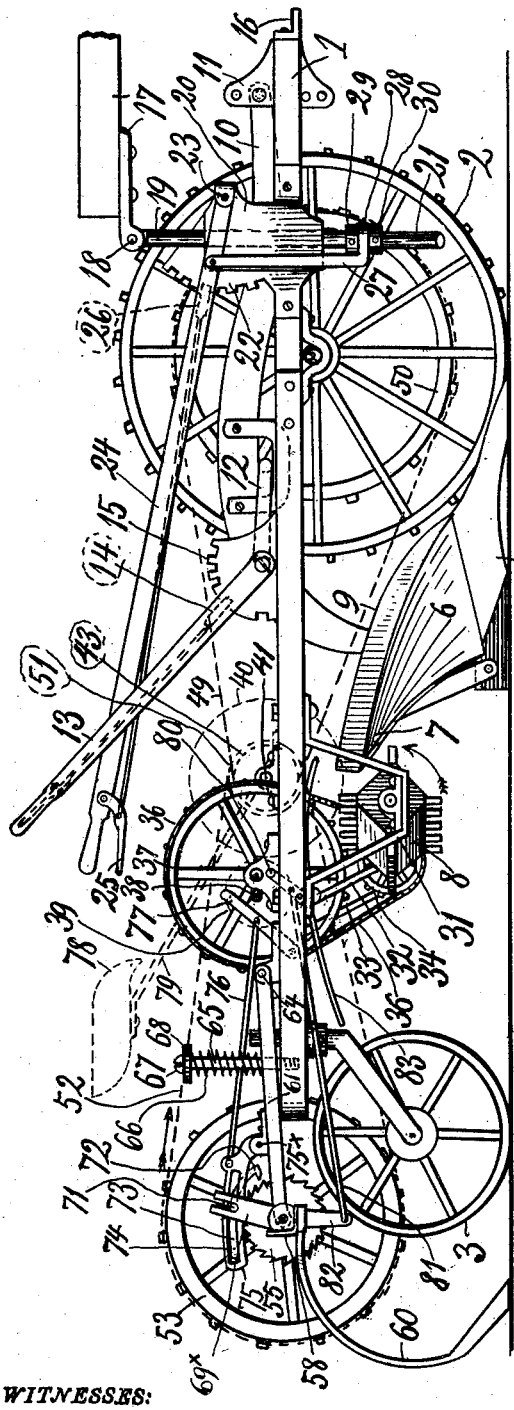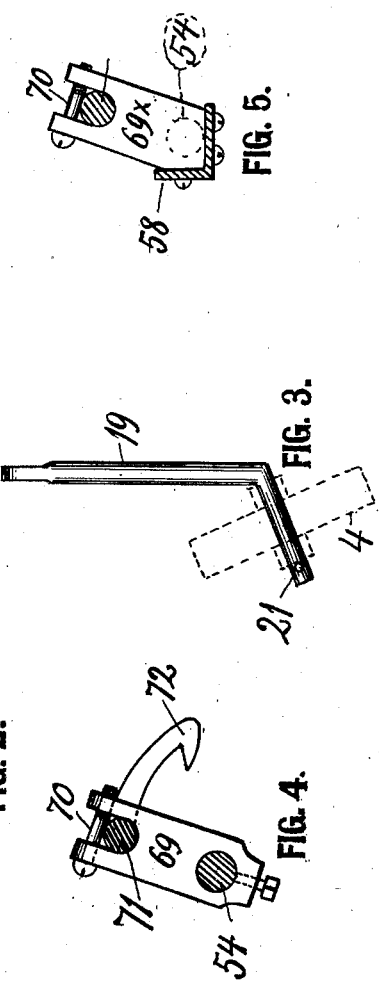

UNITED STATES PATENT OFFICE.

NELS WILLIAM NELSON AND ALBERT J. THORVIG, OF SPICER, MINNESOTA.

QUACK-GRASS-DESTROYING MACHINE.

983,304. Specification of Letters Patent. Patented Feb. 7, 1911.

Application filed March 11, 1910. Serial No. 548,666.

*To all whom it may concern:*

Be it known that we, NELS W. NELSON and ALBERT J. THORVIG, citizens of the United States, residing at Spicer, in the county of Kandiyohi and State of Minnesota, have invented a new and useful Quack-Grass-Destroying Machine, of which the following is a specification.

Our invention relates to agricultural machinery; and the main object is to provide an efficient device or machine for uprooting and destroying the so-called quack-grass, "Johnson grass" and other similar weeds, the destruction of which usually requires that they be uprooted dried and burned.

In the accompanying drawings, Figure 1, is a top or plan view of our machine. Fig. 2. is a side elevation of Fig. 1, with the inclined ground wheel near the front end of the frame removed from its stud and a few other parts either omitted or simply indicated in dotted lines as they are clearly understood in Fig. 1; the driver's seat is also indicated in dotted line while in Fig. 1 it is removed showing only a portion of its support. Fig. 3 is a front elevation of the post 19 in Fig. 1, with the wheel 4 in dotted outline. Fig. 4 is an enlarged section on line $a$—$a$ in Fig. 1. Fig. 5 is a section on line $b$—$b$ in Fig. 1.

Referring to the drawing by reference numerals it will be seen that the machine involves a horizontal skeleton frame 1 mounted on a bull-wheel or traction wheel 2, a rear caster wheel 3 and near the front a laterally inclined supporting wheel 4 (shown in Fig. 1 and in dotted lines in Fig. 3); said inclined wheel serves the same purposes in this case as do such wheels on the regular sulky plows.

In the frame is mounted a plow 5, whose mold board 6 is twisted with its rear end 7 to a horizontal position and preferably ends on an oblique line so as to come parallel to an obliquely mounted horizontal toothed roller 8 rotating near the end of the mold board in the direction shown by an arrow in Fig. 2. The inner edge of the mold board is provided with an upwardly curved guard 9.

The beam 10 of the plow is pivoted in a clevis 11 and is raised and lowered by a crank 12 and lever 13 having a dog 14 engageable with notches in a sector 15 on the frame. The frame is drawn by horses or other power attached to either of the holes at 16. The guiding tongue 17 is pivotally attached at 18 to the upper end of a post 19 to swing up and down at said joint; the post is journaled in a bearing 20, fixed on the frame and has its lower end provided with an inclined stud 21 on which the wheel 4 rotates. For the purpose of raising and lowering said wheel the bearing 20 is provided with a toothed sector 22, and forward thereof is pivoted at 23 a lever 24 having a finger latch 25 and a dog 26 controlled thereby and engaging the sector; from said lever depends a rod 27, whose lower end 28 is bent at right angle and embraces loosely the post with a collar 29, above it and 30 below it.

The toothed roller 8 is journaled in three hangers 31, 32, 33, and at its inner end is fixed a sprocket 34, which is driven by a link-belt 36 and a larger sprocket 37 fixed on a shaft 38; on the latter is fixed a bevel gear 39, which is rotated by a larger bevel gear 40 fixed on a shaft 41; on the latter shaft is fixed a clutch member 42 and adjacent thereto rotates a clutch member 43 which is thrown into and out of engagement with the member 42 by means of a shifter lever 44 fulcrumed at 45 and adapted to be sprung into either of two notches 46 and 47 of a metal strip 48 fixed on the frame. The member 43 also constitutes a small sprocket driven by a link-belt 49 and a large sprocket 50 fixed on the shaft or to the side of the bull-wheel 2. On the shaft 41 is also fixed a small sprocket 51, which by a link belt 52 rotates a larger sprocket 53 journaled on a shaft 54 and having a ratchet wheel 55 fixed to one side of it. The shaft portion 54 is journaled in a bearing 56 and is secured at 57 to an angle-iron bar 58, which is pivotally supported by joints $59^a$, $59^b$ and $59^c$ in axial line with the bearing 56, so that the angle-bar is practically the main portion of a rock shaft composed of it and of the shaft portion 54. To said rock-shaft, or angle bar portion thereof, is secured a series of curved rake teeth 60. The rotatable rake thus provided is mounted on three arms, 61, 62, 63, which are pivoted with their front ends at 64 upon the main frame, on which they are yieldingly pressed down by springs 65 (see Fig. 2) encircling each a stud 66, that is fixed in the frame and extends through an aperture in the arm and is provided with a head 67 and therebelow with a washer 68 bearing upon the upper end of the spring.

In open bearings 69 and 69× (best shown in Figs. 4 and 5) fixed on the rock-shaft or angle bar 58 is retained by screw pins 70, or other suitable means, a crank shaft 71, whose outer end is formed with a hook 72 adapted to engage the teeth of the ratchet wheel 55; and the crank proper, 73, engages in a slot 74 of a yoke 75, whose front end is pivoted at 75× upon one of the arms 62; said yoke is connected by a rod 76 to a foot lever 77 placed within reach of the operator's left foot when he sits on the seat 78, which is mounted on a springy arm 79. Another foot lever, 80, is connected by a rod 81 to a rocker arm 82 depending from the angle bar 58 of the rake.

In Fig. 2 is shown a curved shield 83, which is to guide the earth and weed thrown by the roller, so they do not fly upward into the machinery but must fall in front of the rake.

In the operation of the machine, when the machine is drawn forward with the operator on the seat 78, and the field to be operated on is reached, the clutch wheel 43 is by the lever 44 thrown into clutching contact with the member 42, whereby the roller 8 is caused to rotate at the desired speed; the plow is then lowered into the ground the necessary depth for plowing up the weed with the roots; the furrow or crust thus plowed up is by the ground in front of the plow forced upward and rearward over the mold board, and as fast as it reaches the roller 8 it is by the teeth of same beaten so fine that the rake teeth 60 in passing through the thus pulverized sod gather before them all the weeds and roots thereof until the same have so accumulated in front of the rake that the operator finds the foot lever 80 to have an unusual rearward pressure against his foot, which indicates that the rake has gathered enough and ought to be released from its load, the operator then presses forward with his left foot on the lever 77, which acts on the yoke 75, to raise it, and as it rises it turns the crank 73 and thereby causes the hook 72 to engage the ratchet wheel 55 and the latter causes the rake to rotate sufficiently to disengage the load, and as soon as this is done and the rake tilts a little more, the crank 73 moves into the front end of the slot 74 and thereby disengages the hook from the ratchet wheel and permits the rake to turn again to normal working position. The springs 66 help to hold the rake in proper contact with the ground even when the latter may be uneven; they also permit of raising the rake while driving the machine idle; for the latter purposes also the rotating motion of the rake may be made use of. When the weed has thus been gathered into windrows and given time to dry by either the wind or the sun, it is finally ignited and utterly destroyed by fire. In this way the weed with roots and unmatured seed is effectively destroyed. The roller 8 may possibly occupy a transverse position in the frame but we prefer to place it in the oblique position shown, as it will then throw the pulverized sod and the weed into the path of the rake while the latter is in a position in the frame to leave the heaps or windrows desirably far beyond the path of the next movement or operation of the machine.

To a correct understanding of the nature of this machine it should be remembered that destruction of quack grass is not accomplished by only plowing up the sod in which it grows, nor by plowing and crushing the sod, but by also raking out the weed and its root and destroying same, and hence the plow, the roller and the rake combine in the single action and result of destroying the weeds referred to.

What we claim is.

In a machine of the kind described, and mounted in a wheeled frame, the combination with a plowing device of a pulverizing toothed roller rearward thereof, and a rake rearward of the roller and means for rotating the roller while the machine is in motion on the ground; said rake and roller being disposed laterally to one side in the frame and said plowing device having an inclined and at the rear level mold board elevating and delivering the plowed up earth to the roller, said mold board being directed with its rear end obliquely toward the roller, and guarding means on the board to guide the earth along it.

In testimony whereof we affix our signatures, in presence of two witnesses.

NELS WILLIAM NELSON.
ALBERT J. THORVIG.

Witnesses:
　CHARLOS OLSON,
　WILLIAM OLSON.